(12) United States Patent
Berger et al.

(10) Patent No.: US 7,844,976 B2
(45) Date of Patent: Nov. 30, 2010

(54) PROCESSING DATA ACROSS A DISTRIBUTED NETWORK

(75) Inventors: Alexander Berger, Sammamish, WA (US); Mosha Pasumansky, Redmond, WA (US); Thomas Hargrove, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/530,383

(22) Filed: Sep. 8, 2006

(65) Prior Publication Data

US 2008/0126552 A1 May 29, 2008

(51) Int. Cl.
*G06F 3/00* (2006.01)
*G06K 9/40* (2006.01)

(52) U.S. Cl. .................. 719/328; 719/310; 382/261

(58) Field of Classification Search ............... 719/310, 719/318, 328; 382/261
See application file for complete search history.

(56) References Cited

U.S. PATENT DOCUMENTS

| | | | | |
|---|---|---|---|---|
| 5,617,577 A | * | 4/1997 | Barker et al. | 712/12 |
| 5,838,979 A | * | 11/1998 | Hart et al. | 717/146 |
| 6,208,990 B1 | | 3/2001 | Suresh et al. | |
| 6,219,105 B1 | * | 4/2001 | Kashiro et al. | 348/521 |
| 6,307,953 B1 | * | 10/2001 | Nevel et al. | 382/111 |
| 6,604,104 B1 | | 8/2003 | Smith | |
| 7,051,334 B1 | | 5/2006 | Porter et al. | |
| 7,058,615 B2 | | 6/2006 | Yao | |
| 2005/0055328 A1 | | 3/2005 | Yagawa | |
| 2005/0187974 A1 | | 8/2005 | Gong | |
| 2005/0187991 A1 | | 8/2005 | Wilms | |
| 2005/0228728 A1 | | 10/2005 | Stromquist | |
| 2005/0240395 A1 | * | 10/2005 | Wiser et al. | 704/201 |
| 2006/0026199 A1 | | 2/2006 | Crea | |
| 2006/0069717 A1 | | 3/2006 | Mamou et al. | |
| 2007/0174852 A1 | * | 7/2007 | Smirnov et al. | 719/328 |

OTHER PUBLICATIONS

Berthold Lichtenbelt, Design of A High performance Volume Visualization system , 1997.*
What's New in SQL Server 2005. <microsoft.com/sql/prodinfo/overview/whats-new-in-sqlserver2005.mspx>.
ETL. <computerworld.com/databasetopics/businessintelligence/datawarehouse/story/0,10801,89534,00.html>.
ETL Portal. <dmreview.com/portals/portal.cfm?topicId=230206>.

* cited by examiner

*Primary Examiner*—Lechi Truong
(74) *Attorney, Agent, or Firm*—Shook, Hardy & Bacon L.L.P.

(57) ABSTRACT

A system, method, and related techniques are disclosed for processing data across a distributed network to a plurality of machines. The method may include receiving a first user-supplied transform and generating a first package based on the first user-supplied transform. The method may further include receiving a designated key and generating a second package based on the key. Furthermore, the method may include receiving a second user-supplied transform and generating a third package based on the second user-supplied transform. Moreover, the method may include distributing the first, second, and third packages to a plurality of machines using a cluster API.

15 Claims, 6 Drawing Sheets

US 7,844,976 B2

PROCESSING DATA ACROSS A DISTRIBUTED NETWORK

CROSS-REFERENCE TO RELATED APPLICATION

Not applicable.

STATEMENT REGARDING FEDERALLY SPONSORED RESEARCH OR DEVELOPMENT

Not applicable.

BACKGROUND

An application such as the Microsoft SQL Server Integration Services (SSIS), from the Microsoft Corporation, is a platform for building high performance data integration solutions, including extraction, transformation, and load packages for data warehousing. SSIS may include graphical tools and wizards for building and debugging packages; tasks for performing workflow functions such as File Transfer Protocol (FTP) operations, for executing Structured Query Language (SQL) statements, or for sending email messages; data sources and destinations for extracting and loading data; transformations for cleaning, aggregating, merging, and copying data; a management service for administering SSIS; and application programming interfaces (APIs) for programming the Integration Services object model.

Currently, data transform applications developed using SSIS are only able to run on a single computer. Typically, the data transform applications include reading from a file and writing to a file. That may be sufficient for a single machine, however, it may not be sufficient for using multiple machines, as it may be too cumbersome of a task for multiple machines to handle writing to multiple files.

Because of the single machine limitation, certain SSIS tasks may be impossible or difficult to complete, which may be due to memory requirements, or are not able to meet time requirements, which may be due to low computer count. Even if one were to manually run SSIS on two machines in parallel, one may still have a problem of distributing the input data between the two machines and doing aggregations across all data.

SUMMARY

A system, method, and computer-readable media are disclosed for processing a data file across a distributed network of a plurality of machines. The method may include receiving an input file including one or more data items, and filtering the input file at a first package. The method may further include sorting the filtered input file at a second package, and summing frequencies related to the one or more data items within the sorted input file at a third package. Within the method, the first, second, and third packages may be distributed across a plurality of machines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The present invention describes, among other things, a system and method for connecting SSIS input and output to a cluster API, along with a mechanism for conducting a distributed sort that allows for efficient partitioning and aggregations on a specific data key. This technology can allow users to build SSIS packages that can scale to large clusters of computers.

The invention includes a distributed Extract Transform Load (ETL) system, SSIS for example, that can connect SSIS to a cluster API by using custom SSIS source and destination transforms. These two transforms may be configured to handle communication to the cluster API, and may allow the user to efficiently partition and distribute data by supplying a hash function, compare function, and partition count. Once the data is sorted on a given key, aggregations on that key may happen in parallel on the cluster nodes.

Figure 1:
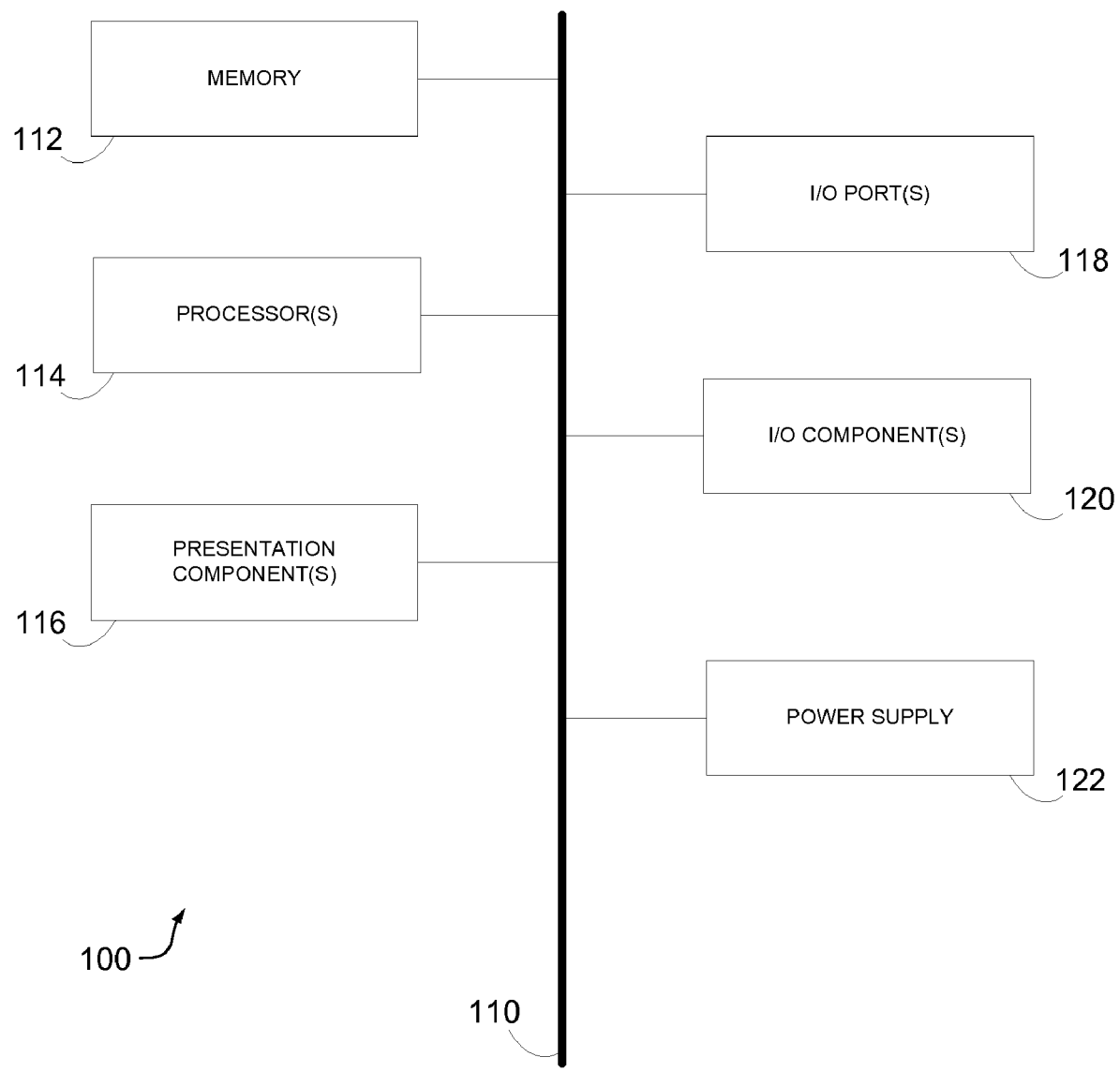
FIG. 1 is a block diagram that illustrates an exemplary operating environment for implementing an embodiment of the present invention.

Referring initially to FIG. 1 in particular, an exemplary operating environment for implementing an embodiment of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
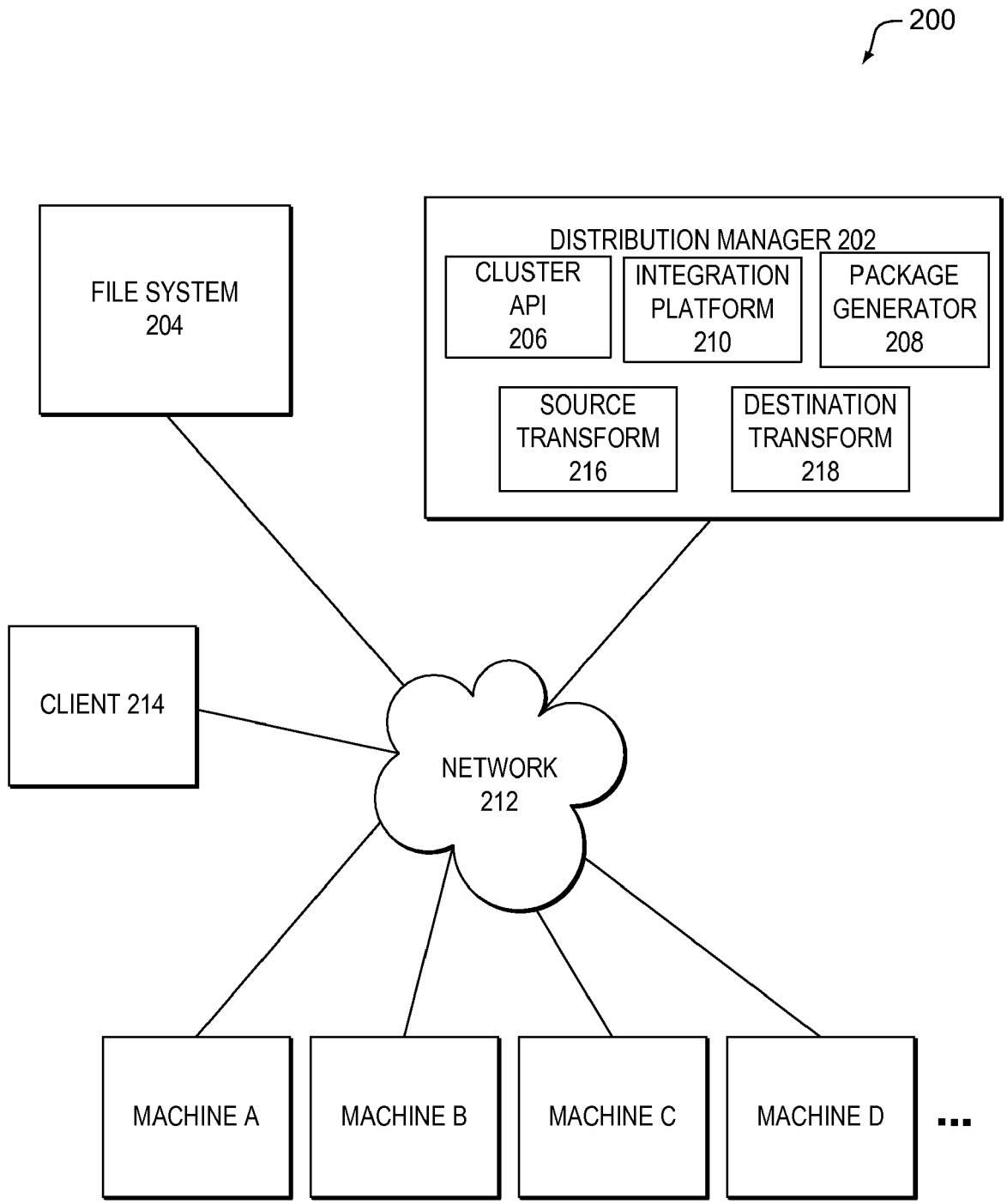
FIG. 2 is a block diagram that illustrates an embodiment of a system for implementing the present invention.

FIG. 2 is a block diagram that illustrates an embodiment of a system 200 for implementing the present invention. In an embodiment, system 200 may include devices such as distribution manager 202, file system 204, one or more machines A-D or other number of machines, and client 214. In an embodiment, each of these devices may be a computing device 100 as described in FIG. 1. Each of these devices may include a communication interface. The communication interface may be an interface that can allow each device to be directly connected to any other device or allows each device to be connected to another device over network 212. Network 212 can include, for example, a local area network (LAN), a wide area network (WAN), or the Internet. In an embodiment, a device can be connected to another device via a wireless interface.

Client 214 may be or can include a desktop or laptop computer, a network-enabled cellular telephone (with or without media capturing/playback capabilities), wireless email client, or other client, machine or device to perform various tasks including web browsing, search, electronic mail (email) and other tasks, applications and functions. Client 214 may additionally be any portable media device such as digital still camera devices, digital video cameras (with or without still image capture functionality), media players such as personal music players and personal video players, and any other portable media device. Client 214 may also be or can include a server such as a workstation running the Microsoft Windows®, MacOS™, Unix®, Linux®, Xenix®, IBM AIX™, Hewlett-Packard UX™, Novell Netware™, Sun Microsystems Solaris™, OS/2™, BeOS™, Mach, Apache, OpenStep™ or other operating system or platform.

Distribution manager 202, file system 204, and machines A-D may be or can include a server such as a workstation running the Microsoft Windows®, MacOS™, Unix®, Linux®, Xenix®, IBM AIX™, Hewlett-Packard UX™, Novell Netware™, Sun Microsystems Solaris™, OS/2™, BeOS™, Mach, Apache, OpenStep™ or other operating system or platform. In an embodiment, file system 204 may be integrated within distribution manager 202. In another embodiment, distribution manager 202 may be a client device.

Distribution manager 202 can be configured to distribute the processing of input data files received from file system 204 across a plurality of machines such as machines A-D. In an embodiment, file system 204 may include a collection of log files of one or more search engines or any other device that can track user browsing history. The log files may include various statistics and other information related to search queries submitted by users, web pages browsed by users, as well as information conventionally found within log files. In an embodiment, distribution manager 202 can include components such as integration platform 210, cluster API 206, package generator 208, source transform 216, and destination transform 218. In another embodiment, one or more of the components may be external to the distribution manager 202.

Integration platform 210 may be a platform for building high performance data integration solutions, including extraction, transformation, and load packages for data warehousing. Integration platform 210 may further be configured to allow users to design their data processing across distributable machines such as machines A-D. Additionally, integration platform 210 may include a design environment that can allow users to design transformation packages, and can include an execution environment that can allow users to execute the transformation packages on a desired machine. In an embodiment, integration platform 210 may be a SSIS.

Cluster API 206 may be configured to aide the process of allowing users to distribute the execution of transformation packages across multiple machines such as machines A-D. In an embodiment, cluster API 206 may be a proprietary Microsoft cluster API such as a Dryad API from the Microsoft Corporation. Dryad is a programming model that has been developed with a goal to make it easier for programmers to implement and deploy large or complex data-parallel applications. Dryad may be used to scale up to applications with petabytes of data running on data-center clusters with thousands of computers, and down to single multiprocessor or multicore computers. A programmer who wants to run an application on Dryad may create a high-level data-flow description (graph) of the application and write sequential programs that are to be run at the nodes of the graph. Dryad may run these programs on available processors, taking full, transparent responsibility for scheduling, communications, and fault tolerance.

In an embodiment, the source transform 216 and the destination transform 218 may be utilized to facilitate communication between the integration platform 210 and cluster API 206, and can allow a user to efficiently partition and distribute data by supplying a hash function, compare function, and partition count. In an embodiment, the source and destination transforms may be used to replace the methods of reading from a file and writing to a file that one would typically use in SSIS. The source transform may be configured to read from streams in the cluster API. When using multiple inputs, the user may supply a compare function and the transform may execute a merge sort on incoming data files. In an embodiment, the output from this transform may be a single connection, so any complexity may be hidden from the package designer. In an embodiment, the destination transform may be configured to write to one or more data streams. When using multiple output streams, the user may specify a partition count (N) and a hash function that can map a data file to a stream number.

Package generator 208 may be configured to generate packages that can be distributed to a plurality of machines such as machines A-D. The packages can be utilized to form a distributed sort. In an embodiment, the distributed sort may be a process in which an input data file, such as particular log file for example, that is typically in an unordered format, is manipulated into a structured format to in order to be distributed and processed across multiple machines. In an embodiment, the generated packages may be SSIS packages.

Figure 3:
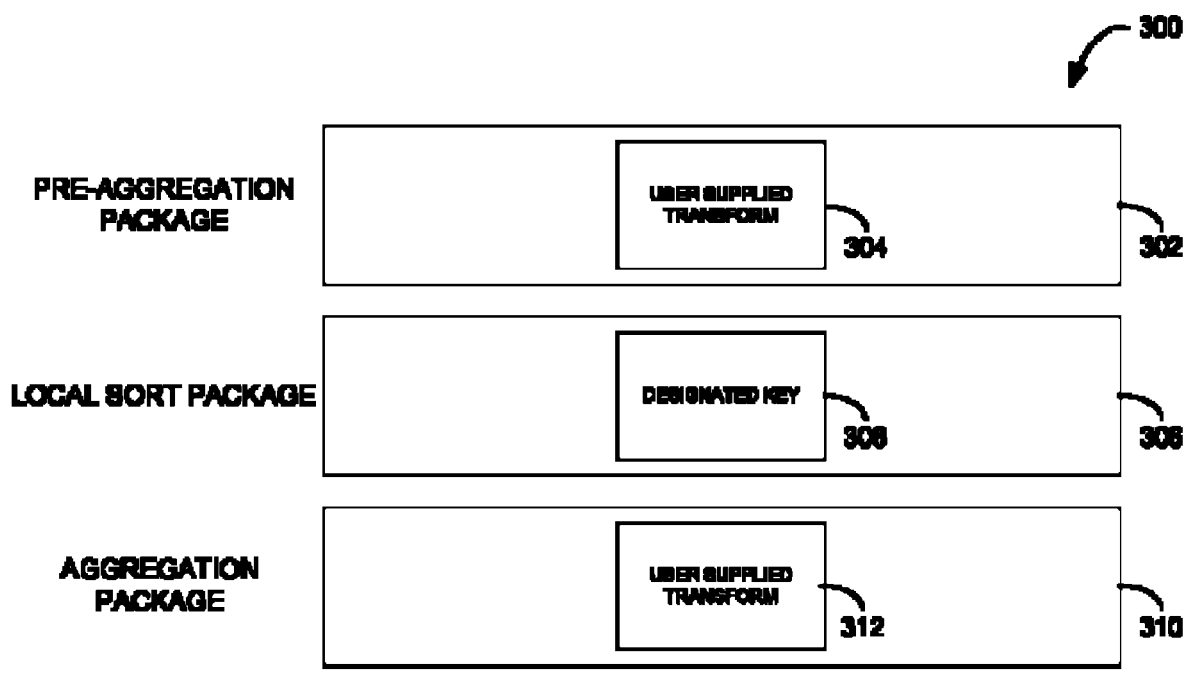
FIG. 3 is a block diagram that illustrates an embodiment of a detailed depiction of a pre-aggregation, local sort, and aggregation package.

In an embodiment, there can be at least three different types of generated packages. These packages may include a pre-aggregation package, a local sort package, and an aggregation package. FIG. 3 is a block diagram 300 that illustrates an embodiment of a detailed depiction of a pre-aggregation, local sort, and aggregation package. In an embodiment, the pre-aggregation package 302 can be configured to filter an input data file based on a user-supplied transform 304. The user-supplied transform 304 can detail how the user wishes to filter the input file. For example, if an input file included a log file of keyword searches for a given time frame for searches conducted everywhere in the world, the user-supplied transform could be configured to filter out all non-U.S. records.

The local sort package 306 can be configured to sort an input file based on a designated key 308. In an embodiment, the local sort package can sort an input file that has been previously filtered by a pre-aggregation package 302. The designated key 308 may be used to define how a user would like the input data file sorted. A designated key may include, but is not limited to, an alphabetized order, a numeric order, user IDs, geographic locations, URL addresses, and IP addresses. For example, in the same example above that was used in describing the pre-aggregation package 302, a user may choose to sort the U.S. records by particular U.S. cities. In sorting the U.S. records, the user may be interested in grouping the keyword search activity of each city. In such an example, the designated key could be the name of each city or IP addresses of each city.

The aggregation package 310 can be configured to sum up the frequencies of one or more data items within the input data file based on a user-supplied transform 312 and produce an output. The frequencies may be the number of times a particular data item is found within the input data file. In an embodiment, the aggregation package 310 can sum the frequencies of an input file that has been previously filtered by a pre-aggregation package 302 and sorted by a local sort package 306. The user-supplied transform 312 can detail the type of frequencies of particular data items that the user would like summed. For example, the aggregation package could sum the frequency in which each keyword within the data file was submitted in a search request for a given time frame. In another example, the aggregation package could sum the frequency in which users visited each web page found within the data file. In an embodiment, the aggregation package 310 can be configured to organize the summed frequencies in an ascending or descending order based on the frequency count of each data item. In the same example described above regarding the pre-aggregation and local sort packages, the aggregation package 310 could be configured to sum the frequency of usage for each keyword used in each city. In such an example, the aggregation package 310 may further be configured to output the keyword with the highest frequency for a desired city.

Figure 4:
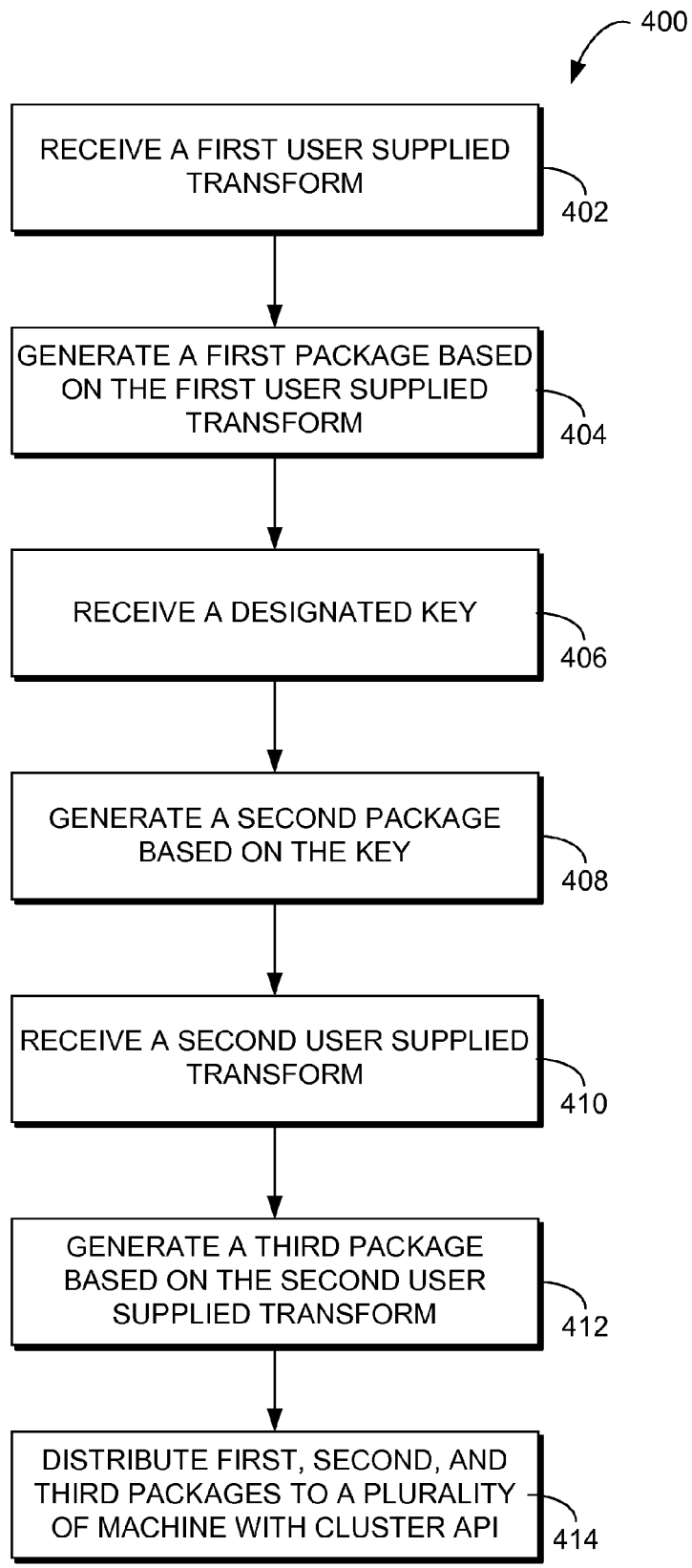
FIG. 4 is a flow diagram that illustrates an embodiment of a method for creating a distributed network for processing a data file across a plurality of machines.

FIG. 4 is a flow diagram that illustrates an embodiment of a method 400 for creating a distributed network for processing a data file across a plurality of machines. At operation 402, a first user-supplied transform is received. In an embodiment, the first user-supplied transform can detail how a user wishes to filter an input data file. At operation 404, a first package is generated based on the first user-supplied transform. In an embodiment, the first package is a pre-aggregation package. At operation 406, a designated key is received. In an embodiment, the designated key may be used to define how a user would like an input data file sorted. At operation 408, a second package is generated based on the designated key. In an embodiment, the second package is a local sort package. At operation 410, a second user-supplied transform is received. In an embodiment, the second user-supplied transform can detail the type of frequencies of particular data items that the user would like summed. At operation 412, a third package is generated based on the second user-supplied transform. In an embodiment, the third package is an aggregation package. At operation 414, the first, second, and third packages are distributed to a plurality of machines using a cluster API. In an embodiment, the cluster API is a Dryad API.

Figure 5:
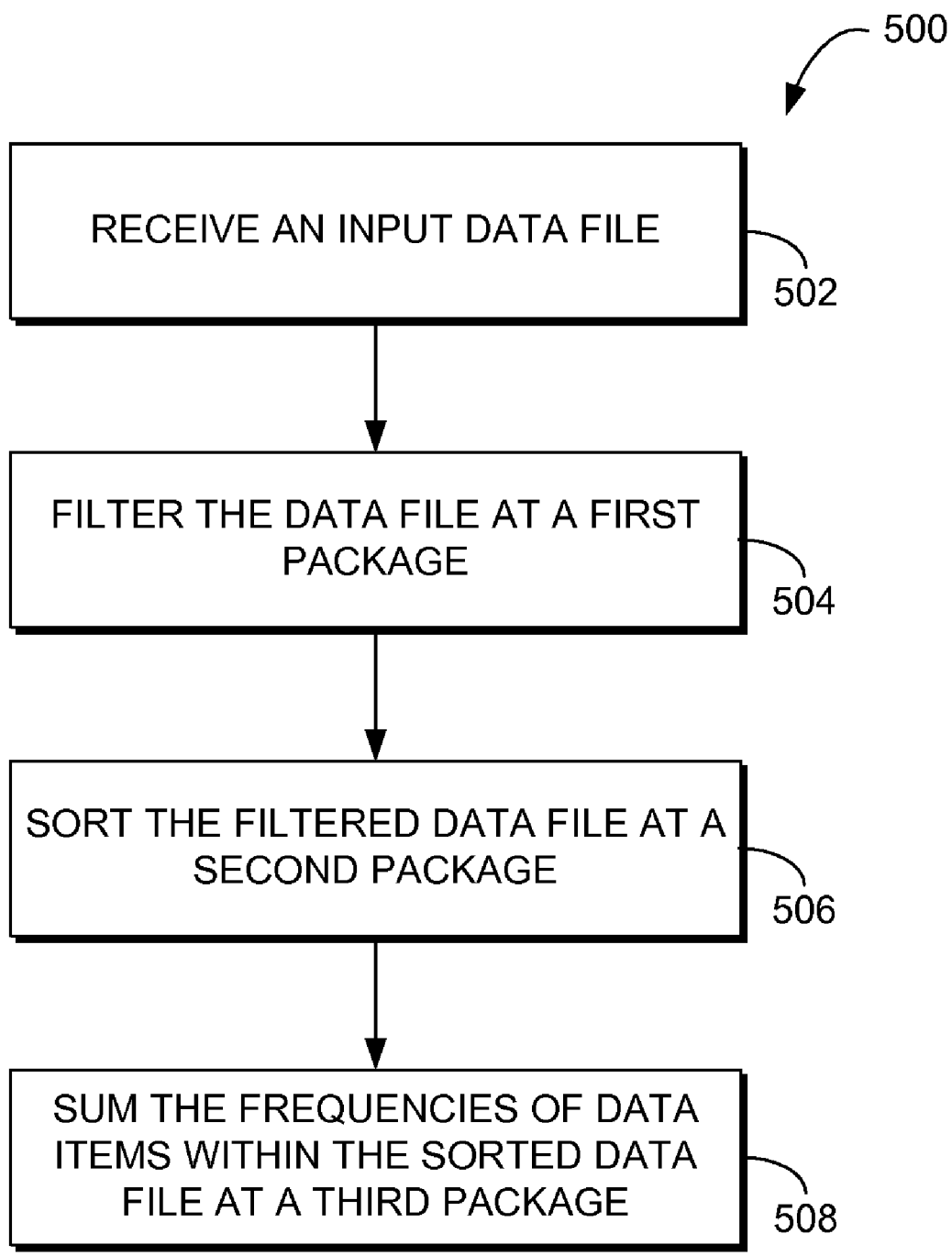
FIG. 5 is a flow diagram that illustrates an embodiment of a method for processing a data file across a distributed network of a plurality of machines.

FIG. 5 is a flow diagram that illustrates an embodiment of a method 500 for processing a data file across a distributed network of a plurality of machines. At operation 502, an input data file is received. The data file can include various types of data. In an embodiment, the input data file is a log file from a search engine. At operation 504, the data file is filtered at a first package. In an embodiment, the first package is a pre-aggregation package that filters the data file based on a first user-supplied transform. At operation 506, the filtered data file is sorted at a second package. In an embodiment, the second package is a local sort package that sorts the filtered data file based on a designated key. At operation 508, frequencies of one or more data items within the sorted data file are summed at a third package. In an embodiment, the third package is an aggregation package that sums the frequencies based on a second user-supplied transform. In an embodiment of the method described in FIG. 5, the first, second, and third packages are distributed across a plurality of machines.

Figure 6:
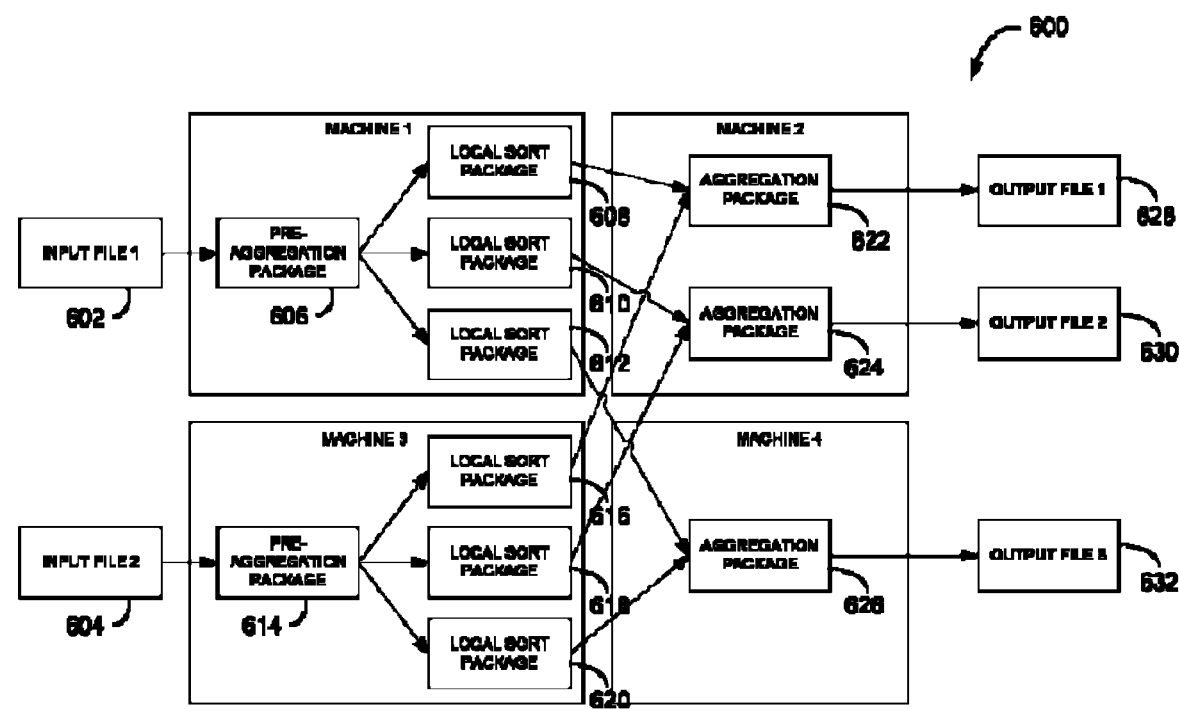
FIG. 6 is a block diagram that illustrates a working example of processing two input data files across a distributed network of a plurality of machines to produce three outputs.

FIG. 6 is a block diagram 600 that illustrates an of processing two input data files across a distributed network of a plurality of machines to produce three outputs. In this working example, the user is interested in outputting the most popular keywords. A cluster API may be configured, through use of algorithms created by a developer, to determine how many machines will be used, and which machines receive a quantity of particular packages. For example, the cluster API may employ load-balancing techniques to determine which machines to use. In an embodiment, the cluster API can determine that the maximum number of machines it can use to distribute work to is equal to the number of inputs the user has, added with the desired number of outputs. For example, in FIG. 6, the cluster API may decide that it can only use a maximum of 5 machines since there are 2 inputs and 3 requested outputs.

Input data files 602 and 604 may be the same log files of a search engine and may be transmitted to pre-aggregation packages 606 and 614 respectively. Pre-aggregation package 606 may contain a user-supplied transform that configures the package to filter the input file 602 to only include keyword searches submitted from users located in west coast states of the U.S. Pre-aggregation package 614 may contain a user-supplied transform that configures the package to filter the input file 604 to only include keyword searches submitted from users located in east coast states of the U.S.

Local sort packages 608, 610, 612, 616, 618, and 620 may contain designated keys that configure the packages to sort the filtered data from files alphabetically once the data is received from the pre-aggregation packages. For example, local sort package 608 can include a designated key that sorts the west coast keywords alphabetically for letters A through I, package 610 can sort west coast keywords alphabetically for letters J through R, and package 612 can sort west coast keywords alphabetically for letters S through Z. Local sort packages 616, 618, and 620 can respectively do the same sorting as local sort packages 608, 610, and 612 for the east coast keywords.

Aggregation packages 622, 624, and 626 may contain user-supplied transforms that configure the packages to sum the frequency of the number of times each keyword was submitted by users. Aggregation package 622 receives an input from local sort packages 608 and 616. Therefore, aggregation package 622 can include east and west coast keywords beginning with the letters A through I and a corresponding frequency count for each keyword. Aggregation package 624 receives an input from local sort packages 610 and 618. Therefore, aggregation package 624 can include east and west coast keywords beginning with the letters J through R and a corresponding frequency count for each keyword. Aggregation package 626 receives an input from local sort packages 612 and 620. Therefore, aggregation package 626 can include east and west coast keywords beginning with the letters S through Z and a corresponding frequency count for each keyword. In an embodiment, based on a sort order from a local sort package, the keywords can be organized in an ascending or descending order based on their corresponding frequency counts.

Output files 628, 630, and 632 can represent the most popular keywords from each aggregation package as requested by the user. In an embodiment, popularity may be determined by the summed frequencies, wherein the most popular data item will have the highest frequency count. For example, output file 628 could include "Britney Spears, 150,000," in which the keyword "Britney Spears" would be the most popular keyword for letters A-I with a frequency count of 150,000. Output file 630 could include "NFL preseason, 160,000," in which the keyword "NFL preseason" would be the most popular keyword for letters J-R with a frequency count of 160,000. Output file 632 could include "World Series, 140,000," in which the keyword "World Series" would be the most popular keyword for letters S-Z with a frequency count of 140,000.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims.

We claim:

1. A method for processing data across a distributed network of a plurality of machines, comprising:
   receiving one or more data items in at least one computing device;
   filtering the one or more data items at a first package in the at least one computing device, wherein the first package filters the one or more data items based on a user-supplied transform;
   sorting the filtered one or more data items at a second package in the at least one computing device, wherein the second package sorts the filtered one or more data items based on a designated key;
   summing frequencies related to the sorted one or more data items at a third package in the at least one computing device, wherein a frequency is a number of times an event occurs for a data item, wherein the third package sums up a number of times the sorted one or more data items are found; and
   distributing the one or more data items to the plurality of machines using a cluster API, wherein the cluster API uses a source and destination transform in order to distribute the one or more data items to the plurality of machines, and wherein the first, second, and third packages are distributed across the plurality of machines.

2. The method according to claim 1, wherein the one or more data items are filtered based on a first user-supplied transform.

3. The method according to claim 1, wherein the filtered one or more data items are sorted based on a designated key.

4. The method according to claim 1, wherein the source transform reads from one or more streams of data, and the destination writes to one or more streams of data.

5. The method according to claim 1, wherein the frequencies are summed based on a second user-supplied transform.

6. A method for processing data across a distributed network to a plurality of machines, comprising:
   receiving a first user-supplied transform in at least one computing device, wherein the first user-supplied transform defines filtering rules;
   generating a first package based on the first user-supplied transform wherein the first package filters the data;
   receiving a designated key, wherein the designated key defines sorting rules;
   generating a second package based on the designated key wherein the second package sorts the data that has been filtered;
   receiving a second user-supplied transform;
   generating a third package based on the second user-supplied transform wherein the third package sums up a number of times the data that has been filtered and sorted is found; and
   distributing the first, second, and third packages to the plurality of machines using a cluster API wherein the cluster API distributes an execution of transformation packages across the plurality of machines.

7. The method according to claim 6, wherein the second user supplied transform defines frequency summing rules.

8. The method according to claim 6, wherein the cluster API is a Dryad API.

9. The method according to claim 6, wherein the cluster API uses a source and a destination transform in order to communicate with the first, second, and third packages.

10. One or more computer-readable storage media having computer-usable instructions stored thereon, that when executed by one or more computing devices, perform a method for processing data across a distributed network to a plurality of machines, comprising:

identifying one or more data items;

transmitting a first user-supplied transform to generate a first package, wherein the first package filters the one or more data items;

transmitting a designated key to generate a second package, wherein the second package sorts the one or more data items that has been filtered, wherein the designated key is at least one of an alphabetized order, a numeric order, a user ID, a geographic location, a URL address, and an IP address;

transmitting a second user-supplied transform to generate a third package, wherein the third package sums up a number of times the one or more data items that have been filtered and sorted are found; and receiving output data that has been processed within the first, second, and third packages, wherein the first, second, and third packages are distributed across the plurality of machines using a cluster API, wherein the cluster API distributes an execution of transformation packages across the plurality of machines.

11. The media according to claim 10, wherein the first user supplied transform defines filtering rules.

12. The media according to claim 10, wherein the designated key defines sorting rules.

13. The media according to claim 10, wherein the second user supplied transform defines frequency summing rules.

14. The media according to claim 10, wherein the output data is processed in an order of the first package, second package, and third package.

15. The media according to claim 10, wherein the one or more data items are identified from a log file of a search engine.

\* \* \* \* \*